Sept. 1, 1959     M. FEINLEIB ET AL     2,902,531
RESERVE TYPE RAPID DISCHARGE PRIMARY CELL
Filed Dec. 27, 1951

Inventors
Morris Feinleib
Howard T. Francis
William H. Graft
By G. J. Kessenich + A. W. Dew
Attorneys

– – –

United States Patent Office 2,902,531
Patented Sept. 1, 1959

2,902,531

RESERVE TYPE RAPID DISCHARGE PRIMARY CELL

Morris Feinleib, Chicago, Howard T. Francis, Tinley Park, and William H. Graft, Chicago, Ill., assignors, by mesne assignments, to the United States of America as represented by the Secretary of the Army Application December 27, 1951, Serial No. 263,715

1 Claim. (Cl. 136—90)

This invention relates to reserve type primary cells and more particularly to a reserve type, rapid discharge primary cell for operation at extremely low temperatures.

Most of the common primary as well as secondary cells exhibit a very poor temperature performance due to freezing of electrolytes, reduction in conductivity and the subsequent greatly increased internal losses in the cell, decreased solubility of anode corrosion products and therefore increased anodic polarization, and decreased reaction rate at the cathode, resulting in a considerably higher cathodic polarization.

In order to obtain a battery that will deliver currents at very low temperatures it is necessary to choose an electrolyte having a low freezing point and the highest possible conductivity. Possible electrolytes include several acids, potassium hydroxide, and perhaps a few salts. The anodic polarization problem excludes practically all salts and bases at low temperatures, as well as some acids. The requirement of a sufficiently high reaction rate at the cathode also eliminates many acids.

The cell of the invention in meeting the above requirements consists of a lead dioxide cathode, a halogen acid electrolyte and an active anode of material such as zinc. Cadmium or iron may be used in the case of a lower voltage cell.

The specific nature of the invention as well as other objects and advantages thereof will clearly appear from the following description and accompanying drawings in which.

Figure 1:
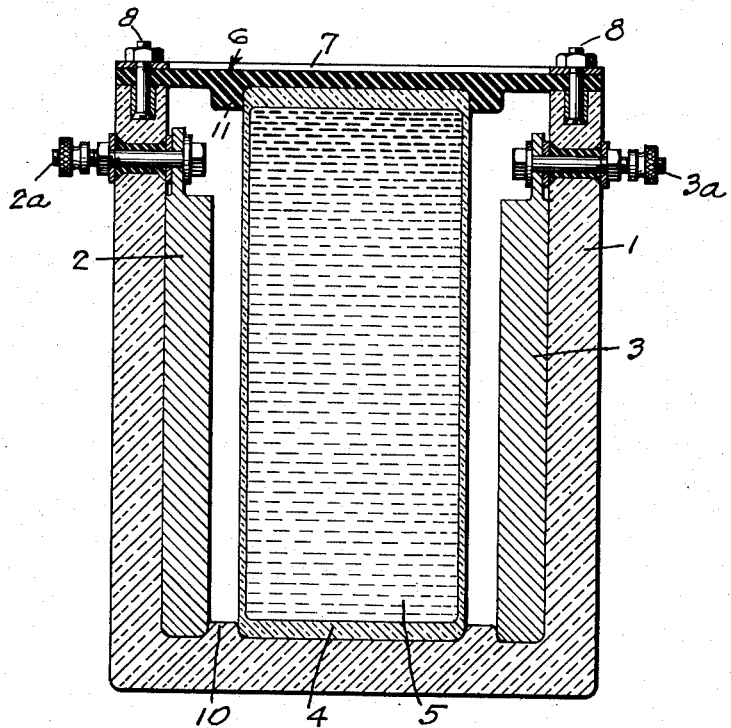
Figure 1 is a vertical cross-sectional view of one form of the cell.
Figure 2:
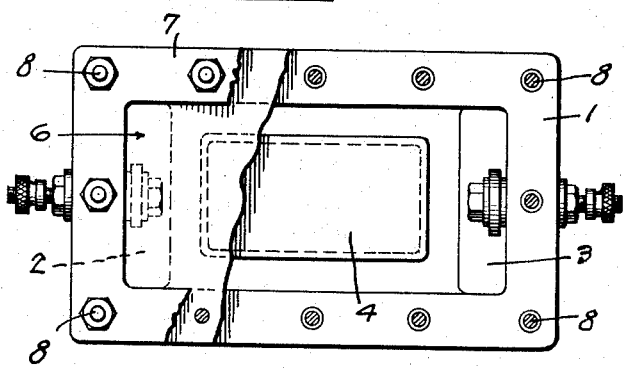
Figure 2 is a top view of the cell of Figure 1 showing certain parts in section.

An embodiment of the invention is shown in Figure 1 wherein a glass container 1 has positioned therein a lead dioxide-lead cathode 2 and an anode 3 of amalgamated zinc or other suitable material, such as lead or cadmium. The cathode and anode may be held in position in the container by any suitable means, as for example by means of terminals 2a and 3a respectively. The electrolyte 5 used in the cell is a halogen acid, such as hydrochloric acid or hydrobromic acid. The electrolyte 5 may be contained in a flask 4 of any frangible material, such as glass. The container may be sealed by a flexible membrane 6 made of rubber, plastic or other acid-proof material capable of distortion under pressure. Threaded studs 8 embedded in the wall of the container about the open end receive the membrane 6 and a ring-like member 7, forming a closure for the open end of the container.

The container 1 has formed on the inner surface of its bottom an inwardly directed cup-shaped member 10. The membrane 6 also has formed on one of its surfaces a similar cup-shaped member 11 which is directed inwardly of the open end of the container 1 when the membrane and container are assembled. The ends of the flask 4 are received by the cup-shaped members which hold the flask in position in the container 1.

Under optimum conditions, an anode of amalgamated zinc is used to reduce local action without voltage loss. A preferred electrolyte is a eutectic mixture of water and hydrochloric acid, the mixture containing 24.4 percent of hydrochloric acid. However a hydrobromic acid-water mixture (35 to 40% HBr) may also be used as an electrolyte. The battery thus constructed may be stored for an indefinite period of time and may be readily activated by a blow or pressure applied to membrane 6, which will cause the flask 4 to fracture, thus permitting electrolyte 5 to come into contact with cathode 2 and anode 3 to activate the battery.

A primary cell of the invention comprising an amalgamated zinc anode, an eutectic HCl electrolyte, and a lead dioxide-lead cathode when tested at −55° C. delivered peak currents of over 3 amperes per square inch of electrode area and can be discharged at the rate of 0.4 ampere per square inch of electrode area for approximately two minutes, giving a terminal voltage slightly higher than two volts at −55° C.

It will be apparent that the embodiment shown is only exemplary and that various modifications can be made in construction and arrangement within the scope of the invention as defined in the appended claim.

We claim:

A reserve-type battery capable of producing peak current of high currents per square inch of electrode area at very low temperatures, said battery comprising: a substantially rectangular container having a top and a bottom end, said container being open at said top end only, a pair of substantially flat rectangular electrodes having first and second ends housed in said container, one electrode of said pair composed of lead dioxide and the other electrode composed of amalgamated zinc, the first ends of said electrodes abutting said bottom end of said container and the second ends adjacent said top end of said container, a pair of electrical terminals adjacent said top end of said container and positioned perpendicularly to the longitudinal axis thereof, said terminals fastening said pair of electrodes to the inner walls of said container in opposed relationship to each other, a substantially rectangular frangible flask housed in said container between opposed electrodes, the longitudinal axis of said flask being parallel to the longitudinal axis of said container, a flexible cover affixed across said top end of said container and sealing said top end of said container, said cover comprising a flexible membrane, an inwardly disposed first cup-shaped member formed in said cover, a second cup-shaped member similar to said first cup-shaped member formed in the inner surface of said bottom end of said container, said first and second cup-shaped members being aligned with respect to the longitudinal axis of said container, said flask having its ends inserted in said cup-shaped members and thereby retained in spaced relationship to said electrodes, and a mixture consisting of water and 24.4% HCl in said flask.

References Cited in the file of this patent

UNITED STATES PATENTS

| 592,722 | Bell | Oct. 26, 1897 |
|---|---|---|
| 2,441,896 | Moir | May 18, 1948 |
| 2,445,306 | Lawson | July 13, 1948 |
| 2,656,401 | Everett | Oct. 20, 1953 |

FOREIGN PATENTS

| 596,523 | Great Britain | Jan. 6, 1948 |
|---|---|---|

OTHER REFERENCES

BIOS, Final Report No. 362, item No. 31 (1945), "German Primary Battery Industry," pp. 10–12.

Schrodt et al.: "The Electrochemical Society," preprint 90–21, paper presented Oct. 16–19, 1946, pp. 281–291.

Heise et al.: "J. Electrochemical Society," vol. 94, No. 3, September 1948, pp. 99–105.